United States Patent
Katayama et al.

(10) Patent No.: US 8,240,751 B2
(45) Date of Patent: Aug. 14, 2012

(54) VEHICLE ROOF SYSTEM

(75) Inventors: Hajime Katayama, Tochigi-ken (JP); Ayumi Mihashi, Tochigi-ken (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 13/013,245

(22) Filed: Jan. 25, 2011

(65) Prior Publication Data

US 2011/0187162 A1   Aug. 4, 2011

(30) Foreign Application Priority Data

Jan. 29, 2010   (JP) .................................. 2010-019113

(51) Int. Cl.
*B60J 7/00* (2006.01)
(52) U.S. Cl. .................. 296/216.07; 296/37.7; 362/490
(58) Field of Classification Search ..... 296/216.01–224, 296/37.7; 362/490
See application file for complete search history.

(56) References Cited

U.S. PATENT DOCUMENTS

| | | | | |
|---|---|---|---|---|
| 5,104,178 | A * | 4/1992 | Bienert | 296/216.08 |
| 5,527,086 | A * | 6/1996 | Mori et al. | 296/223 |
| 6,257,745 | B1 * | 7/2001 | Speth et al. | 362/488 |
| 6,345,860 | B1 * | 2/2002 | Adam et al. | 296/223 |
| 6,367,872 | B1 | 4/2002 | Bohm et al. | |
| 6,588,834 | B2 | 7/2003 | Maeta et al. | |
| 2007/0182219 | A1 | 8/2007 | Mori et al. | |
| 2010/0181805 | A1 | 7/2010 | Hotta et al. | |

FOREIGN PATENT DOCUMENTS

| | | |
|---|---|---|
| JP | 50-125416 A | 10/1975 |
| JP | 58-167216 U | 11/1983 |
| JP | 61-067226 U | 5/1986 |
| JP | 61-105215 A | 5/1986 |
| JP | 5-024437 A | 2/1993 |
| JP | 5-131882 A | 5/1993 |
| JP | 5-330389 A | 12/1993 |
| JP | 11-240333 A | 9/1999 |
| JP | 2000-127765 A | 5/2000 |
| JP | 2001-063371 A | 3/2001 |
| JP | 2001-130349 A | 5/2001 |
| JP | 2002-154328 A | 5/2002 |
| JP | 2006-168531 A | 6/2006 |

* cited by examiner

*Primary Examiner* — Dennis Pedder
(74) *Attorney, Agent, or Firm* — Carrier Blackman & Associates, P.C.; William D. Blackman; Joseph P. Carrier

(57) ABSTRACT

In a vehicle roof system for closing and opening a roof opening (2a) formed in a fixed roof panel (2) of a vehicle with a moveable roof panel (4), an onboard device (30) is located in a laterally central part of the fixed roof panel (2) adjacent to a front edge of the roof opening, and an electric motor (24) for actuating the moveable roof panel is also located adjacent to the front edge of the roof opening but in a laterally offset and longitudinally overlapping relationship with the onboard device. As the electric motor and onboard device do not overlap each other in plan view, the thickness of the roof can be minimized. As the electric motor and onboard device overlap each other in side view, the distance between the upper edge of the front windshield and the front edge of the roof opening can be minimized, and this improves the field of view of the vehicle occupants.

12 Claims, 8 Drawing Sheets

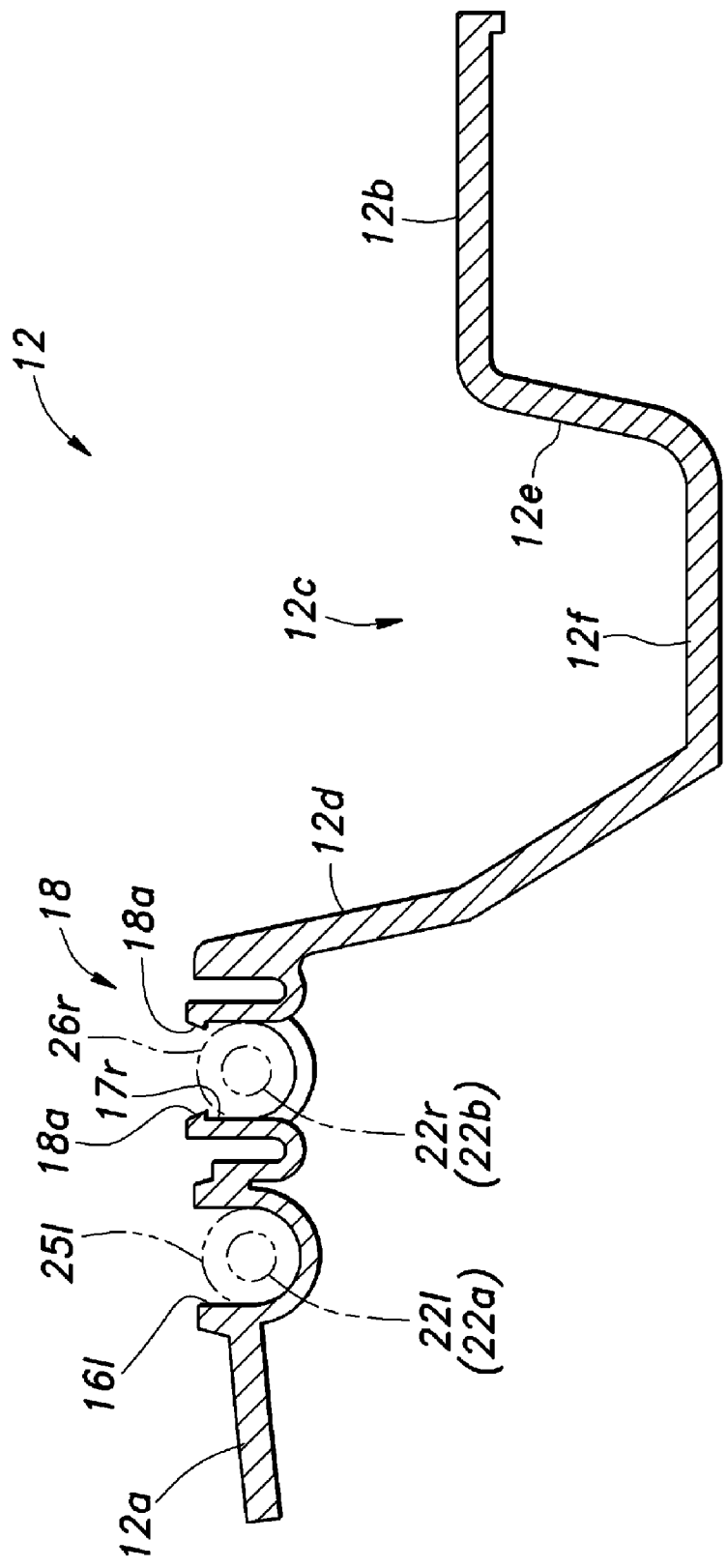

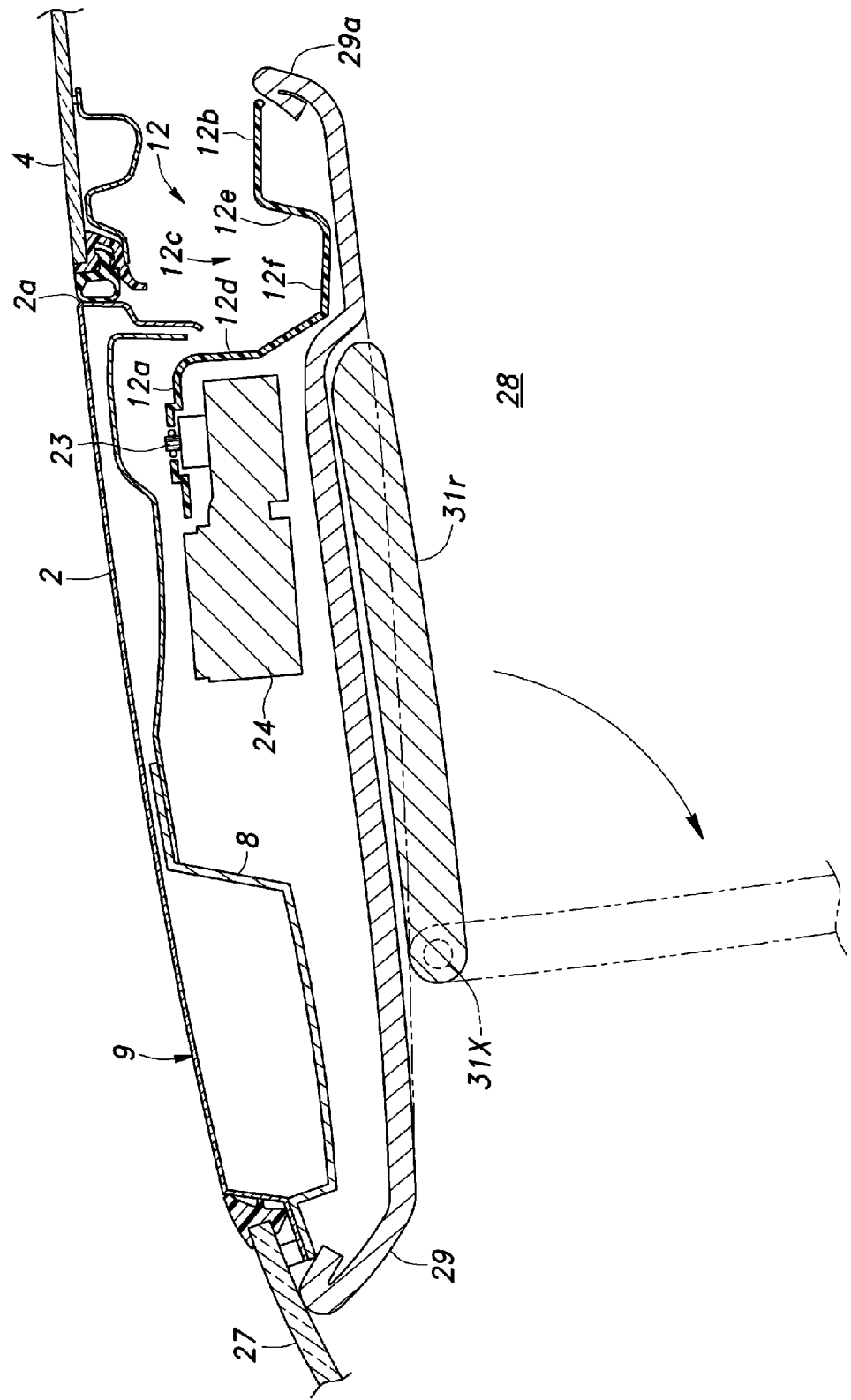

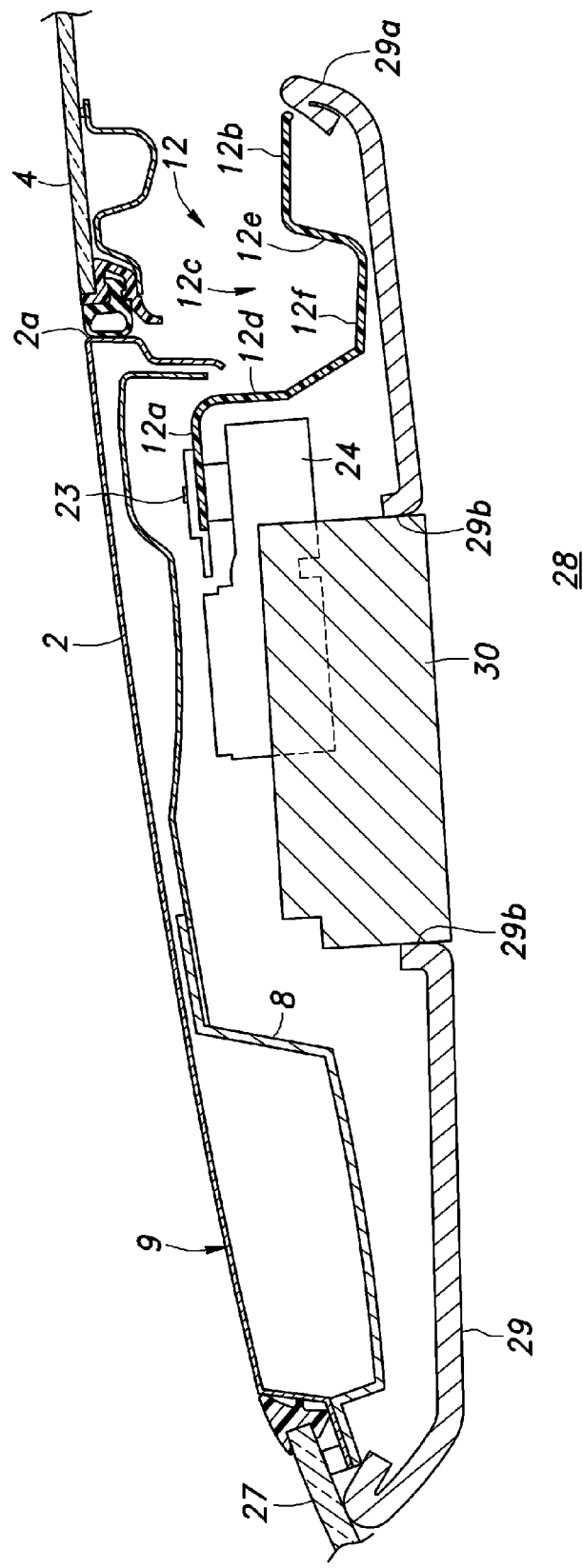

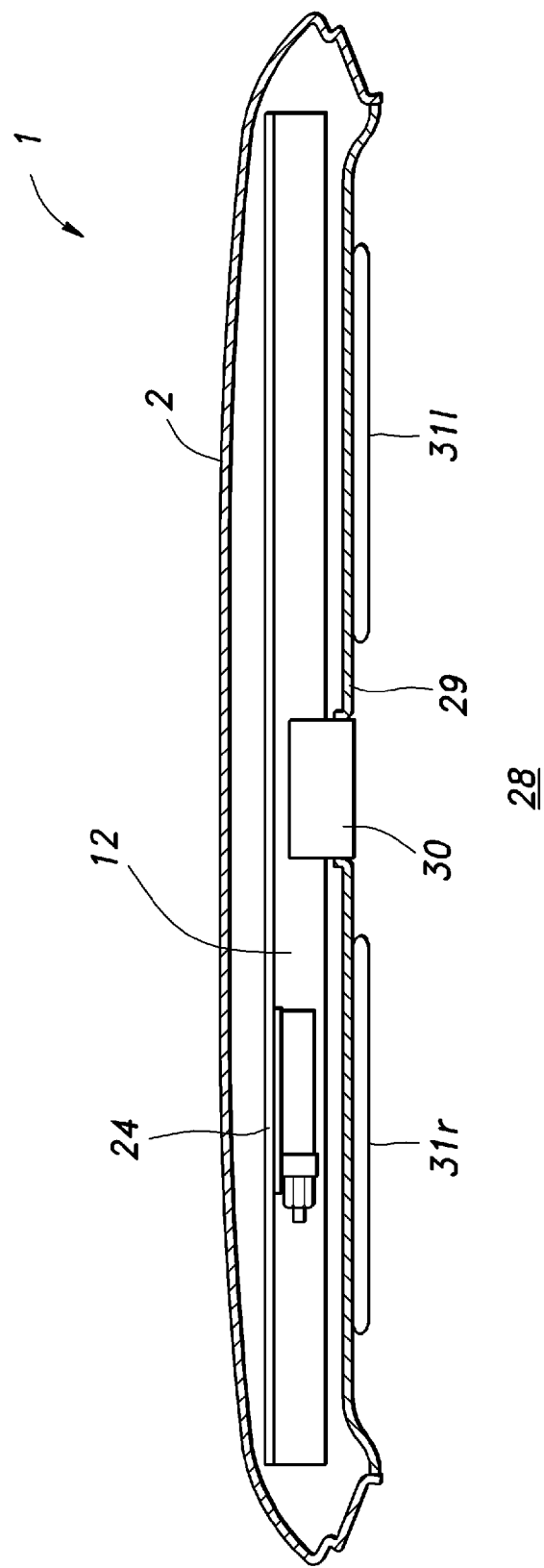

VEHICLE ROOF SYSTEM

TECHNICAL FIELD

The present invention relates to a vehicle roof system including a moveable roof panel and a drive unit for actuating the roof panel between a position to close an opening in a roof of a vehicle and a position to expose the opening.

BACKGROUND OF THE INVENTION

Vehicle roof systems also known as sunroof systems are widely used in passenger vehicles for selectively opening and closing an opening formed in the roof of the vehicle. A typical vehicle roof system comprises a moveable roof panel and a drive unit for actuating the moveable roof panel between a position to close the opening and a position to expose the opening. A pair of guide rails are fixedly secured to the fixed roof panel, and extend along either lateral side of the roof opening, and the moveable roof panel is supported by these guide rails via sliders so as to be slidable in the fore and aft direction. An electric motor is provided centrally on the front edge of the roof opening, and a pair of push-pull cables connected to the corresponding sliders are actuated by the electric motor as required.

The electric motor may be placed either on the front edge or rear edge of the roof opening. If the electric motor is placed on the rear edge of the roof opening, as this part lacks any stiff member, a rear frame is required to be added to the roof structure for supporting the electric motor. It is possible to do away with the rear frame by using highly stiff guide pipes for guiding the push-pull cables, but this also adds to the weight of the vehicle body, and causes some difficulty in the handling of the assembly including the electric motor and guide pipes. Based on such considerations, it is preferable to place the electric motor on the front edge of the roof opening.

It is proposed in copending application US20100181805A1 (patent document 1) to mount an electric motor on the front edge of the roof opening, and use guide pipes (drive pipes and idle pipes) made of plastic material which are firmly retained by a front frame via pipe retaining members.

Sometimes, in addition to the electric motor, onboard devices such as room lamps and electric switches are attached to the part of the roof surrounding the roof opening, and such devices are required to be placed so as not to interfere with the electric motor. In particular, a room lamp is provided adjacent to a central part of the front edge of the roof opening. To avoid the interference between the electric motor and room lamp, it was proposed in JP2001-130349A (patent document 2) to provide a sub frame below the electric motor for supporting a map lamp, a room lamp and vanity lamps, and combine the electric motor and sub frame as an assembly that can be installed in the vehicle roof as a single unit.

However, according to the vehicle roof structure disclosed in patent document 2, the room lamp and electric motor are placed one above the other in an overlapping relationship in plan view so that the thickness of the vehicle roof (as measured from the lower surface of the roof lining and the upper surface of the roof panel) inevitably increases. To avoid this problem, it is conceivable to place the room lamp at a relatively forward position, and place the electric motor between the room lamp and the front edge of the roof opening. However, this necessitates the front edge of the roof opening to be placed more rearward than desired. If the roof opening is located too far back in the roof, the viewing angle of the vehicle occupant through the roof opening is so upright that the vehicle occupant's field of view is restricted, and the benefits of the sunroof system are diminished.

BRIEF SUMMARY OF THE INVENTION

In view of such problems of the prior art, a primary object of the present invention is to provide a vehicle roof system that does not require the thickness of the vehicle roof to be increased even when an onboard device is placed centrally in the part of the roof panel adjacent to the front edge of the roof opening.

A second object of the present invention is to provide a vehicle roof system that allows the front edge of the roof opening to be brought highly close to the front end of the roof panel (or the upper edge of the windshield) even when an onboard device is placed centrally in the part of the roof panel adjacent to the front edge of the roof opening.

According to the present invention, such objects can be accomplished by providing a vehicle roof system for closing and opening a roof opening formed in a fixed roof panel of a vehicle with a moveable roof panel, comprising: front frame secured to a lower surface of the fixed roof panel and extending laterally along a front edge of the roof opening; an electric motor attached to the front frame; a power transmitting system for transmitting an output of the electric motor to the moveable roof panel; and an onboard device attached to the fixed roof panel of the vehicle adjacent to the front edge of the roof opening; wherein the onboard device is located in a laterally central part of the fixed roof panel, and the electric motor is laterally offset from but longitudinally overlapping with the onboard device.

As the electric motor and onboard device do not overlap each other in plan view, the thickness of the roof can be minimized. As the electric motor and onboard device overlap each other in side view, the distance between the upper edge of the front windshield and the front edge of the roof opening can be minimized, and this improves the field of view of the vehicle occupants.

The stiffness and mechanical strength of the front frame can be ensured if the front frame is fixedly secured to the fixed roof panel at a plurality of mounting features provided thereon. It is important for the front frame to be adequately stiff so that the power transmitting system typically including a pair of push-pull cables is enabled to transmit the actuating force to lateral sides of the moveable roof panel in a properly synchronized manner. Thus, the front frame can be made of light-weight material such as plastic material. Preferably, the mounting features are provided adjacent to relatively heavy objects supported by the front frame. Based on such a consideration, at least one of the mounting features is located between the onboard device and electric motor.

As the electric motor is subjected to a significant reaction force, the support for the electric motor is required to be particularly stiff. Based on such a consideration, two of the mounting features may be provided adjacent to either lateral side of the electric motor.

According to a preferred embodiment of the present invention, the front frame includes a front planar part extending substantially horizontally and a groove part formed along a rear edge of the front planar part, the groove part including a bottom wall located at a lower elevation than the front planar part, and is fixedly secured to the fixed roof panel at a plurality of mounting features provided on the front planar part. Furthermore, at least a rear end of the onboard device may be located under the front planar part. Thereby, the electric motor can be mounted in a highly compact manner.

According to a particularly preferred embodiment of the present invention, the electric motor is attached to the lower surface of the front planar part, and has an output shaft passed through an opening formed in the front planar part, and the power transmitting system includes a push-pull cable guided along an upper surface of the front planar part to transmit an output power of the electric motor to the moveable roof panel.

The vehicle roof system may further comprise a roof lining secured to a lower surface of the fixed roof panel in at least partly defining a space therebetween, and the onboard device may be exposed to a passenger compartment through an opening formed in the roof lining.

BRIEF DESCRIPTION OF THE DRAWINGS

Now the present invention is described in the following with reference to the appended drawings, in which:

FIG. 5 is a sectional view taken along line V-V of FIG. 4;
FIG. 6 is a sectional view taken along line VI-VI of FIG. 4;
FIG. 7 is a sectional view taken along line VII-VII of FIG. 4;
and
FIG. 8 is a sectional view taken along line VIII-VIII of FIG. 4.

DETAILED DESCRIPTION OF THE PREFERRED EMBODIMENTS

Figure 1:
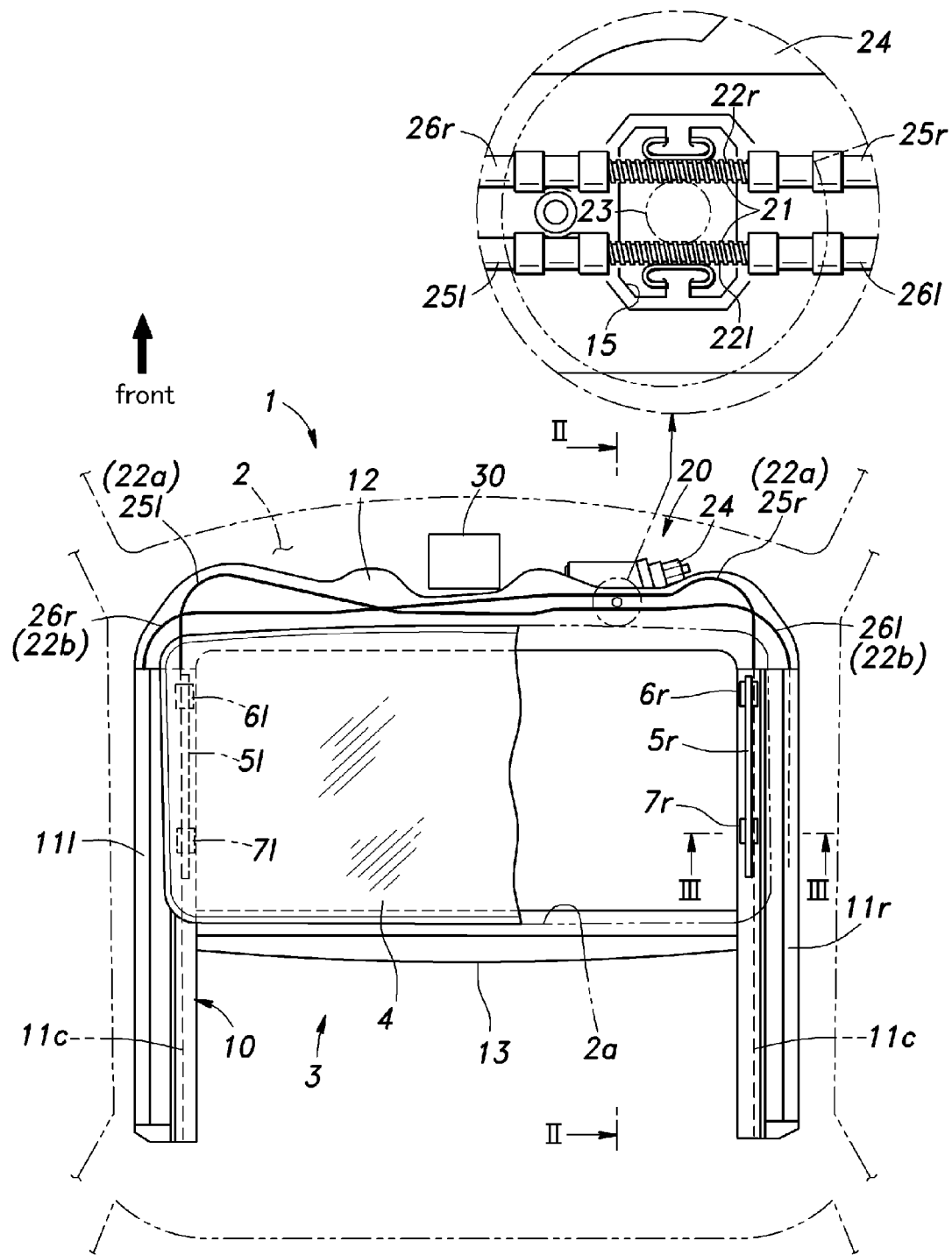
FIG. 1 is a simplified plan view of a vehicle roof system embodying the present invention.

FIG. 1 is a see-through plan view showing the vehicle roof system embodying the present invention. The illustrated vehicle roof 1 comprises a fixed roof panel 2 accounting for a large part of the vehicle roof 1 and formed with a rectangular opening 2a in a front part thereof, and a sunroof system 3 configured to selectively close and open the roof opening 2a.

A large part of this vehicle roof system is symmetric with respect to the central longitudinal plane of the vehicle body, and only one of two symmetric parts may be discussed in the following description where appropriate as the two parts are essentially identical to each other. In some places, such symmetric parts are denoted with a numeral with a suffix r or l as the case may be to indicate on which side of the vehicle body the parts in question are located. In other places, these parts are collectively denoted with the corresponding numeral without a suffix.

The sunroof system 3 comprises a sunroof frame 10 fixedly secured to the roof panel 2 and surrounding the roof opening 2a, a sunroof panel (moveable roof panel) 4 supported by the sunroof frame 2 so as to be moveable at least in the fore and aft direction (slide movement) and a drive unit 20 for actuating the sunroof panel 4 between a fully open position (rearmost position) and a fully closed position (front-most position). The sunroof system 3 of the illustrated embodiment is additionally configured to raise the rear end of the sunroof panel 4 from the fully closed position (tilt movement).

The sunroof frame 10 includes a pair of side frames 11l and 11r extending along either lateral side of the roof opening 2a, a front frame 12 extending between the front ends of the side frames 11l and 11r and a center frame 13 extending between intermediate parts of the side frames 11l and 11r. The front frame 12 extends along the front edge of the roof opening 2a, and the center frame 13 extends along the rear edge of the roof opening 2a. Therefore, the rear ends of the side frames 11l and 11r extend rearward beyond the rear edge of the roof opening 2a. The front frame 12 is C-shaped in plan view having an open side directed toward the roof opening 2a. In the illustrated embodiment, the side frames 11l and 11r are made of extruded aluminum alloy, and the front and center frames 12 and 13 are made of extruded plastic material.

Figure 2:
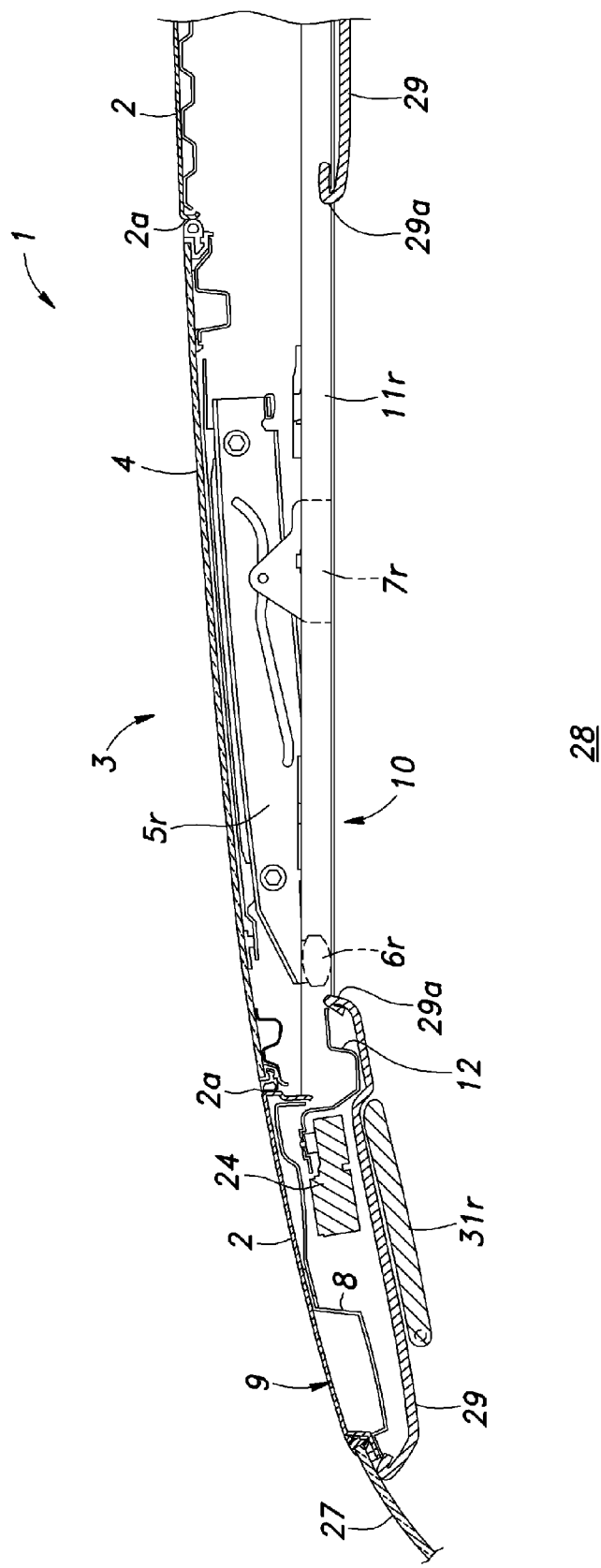
FIG. 2 is a sectional view taken along line II-II of FIG. 1.

Additionally referring to FIG. 2, a pair of panel brackets 5l and 5r extending in the fore and aft direction are attached to the lower side of the sunroof panel 4 along either lateral edge thereof. The panel brackets 5l and 5r are fitted with front sliders 6l and 6r and rear sliders 7l and 7r, respectively, by which the sunroof panel 4 is slidably supported by the side frames 11. The rear sliders 7l and 7r are connected to the corresponding panel brackets 5l and 5r via a cam mechanism that controls the sliding movement and tilting movement of the sunroof panel 4 under the actuating force of the drive unit 20.

A front roof rail 8 is attached to the lower side of the roof panel 2 and extends in parallel with the front frame 12 at a small distance ahead thereof. The front roof rail 8 is trough-shaped with a convex side facing upward so as to form a front roof frame 9 having a closed cross section in cooperation with the roof panel 2. The front edge of the front roof frame 9 adjoins the upper edge of a windshield panel 27. The front part of the roof panel 2 and windshield panel 27 slope downward toward the front part of the vehicle so as to jointly define a smooth outer contour. A roof lining 29 overlies the roof panel 2 from below, and defines an opening 29a slightly smaller than the roof opening 2a so that the edge of the opening 29a slightly extends into the roof opening 2a in plan view. A space defined between the roof panel 2 and roof lining 29 receives the main part of the sunroof system 3.

Figure 3:
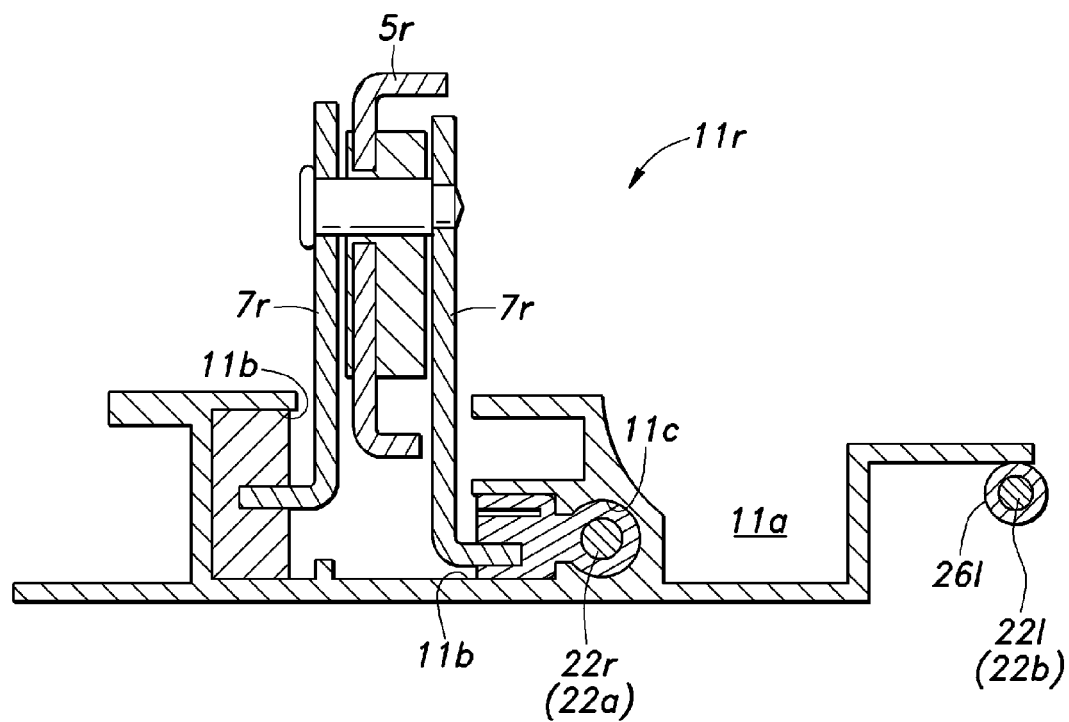
FIG. 3 is a sectional view taken along line III-III of FIG. 1.

As best illustrated in FIG. 3, each side frame 11 is positioned between the roof panel 2 and roof lining 29, and includes a drain trough section 11a having a U-shaped cross section to drain rainwater out of the sunroof system 3, a cable guide section 11c located on the inboard side of the drain trough section 11a and defining a slot for guiding a push-pull cable 22 connected to the rear slider 7, and a guide rail section 11b located on the inboard side of the cable guide section 11c and defining a slot facing outboard to guide the corresponding front slider 6 and rear slider 7.

Figure 4:
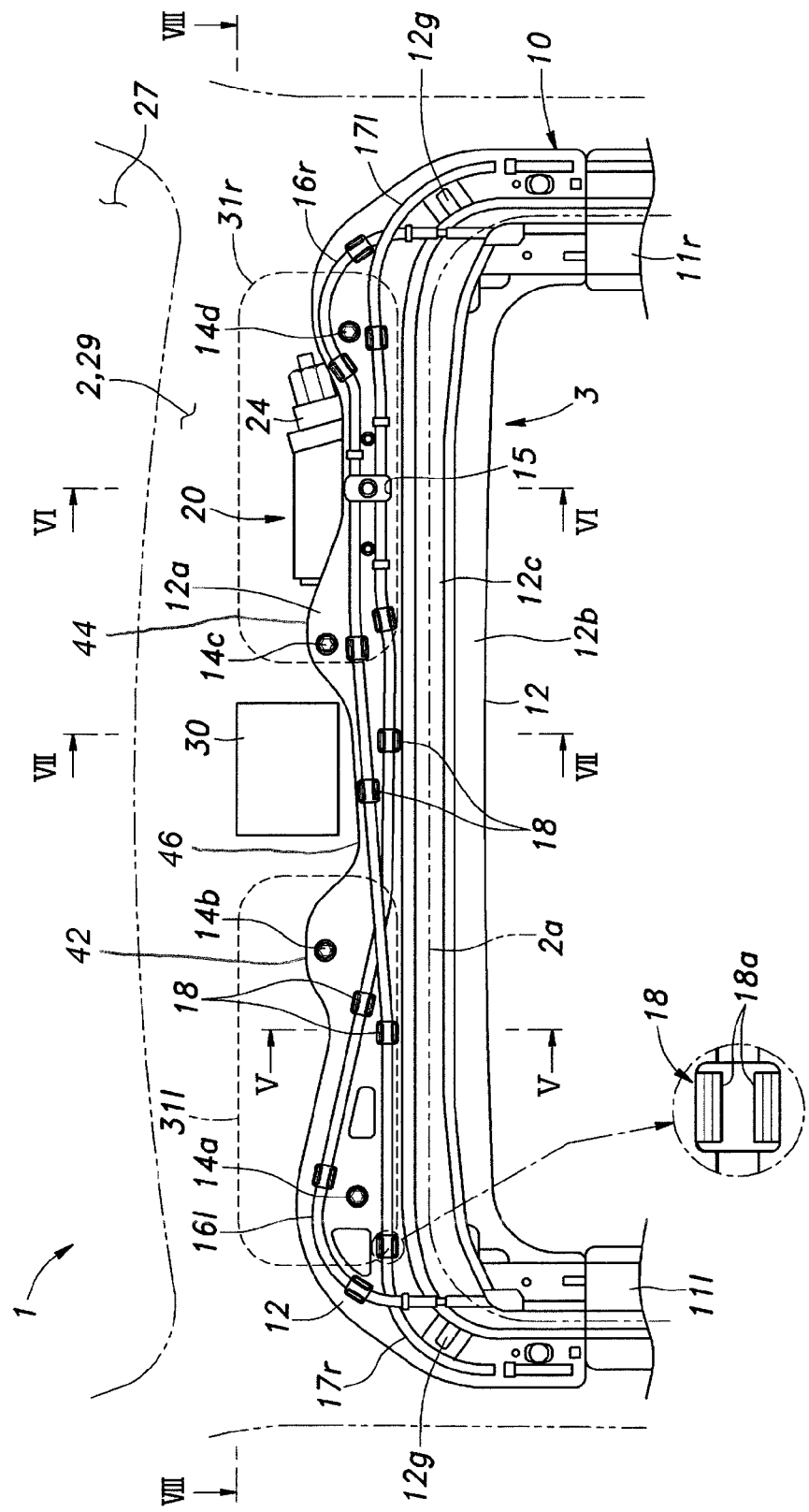
FIG. 4 is an enlarged fragmentary view of a front part of the vehicle roof system.

Referring to FIG. 2, the side frames 11 are disposed horizontally so that the rainwater received in the drain trough section 11a may be drained either in the forward or rearward direction without overflowing when the vehicle is accelerating or decelerating. Accordingly, the roof lining 29 extends substantially horizontally in the region located behind the front edge of the opening 29a, and is bent slightly downward in the region located ahead of the front edge of the opening 29a so as to conform to the contour of the lower surface of the roof panel 2. A pair of sun visor units 31r and 31l for the vehicle operator and the passenger are mounted on the lower side of the part of the roof lining 29 located ahead of the front edge of the opening 29a as shown in FIG. 4.

Referring to FIG. 1, the drive unit 20 includes an electric motor 24 attached to the lower surface of the front frame 12 in a rightwardly offset position and internally incorporated with a gear reduction unit (not shown in the drawings), a drive gear 23 attached to an output end of the electric motor 24, and a pair of push-pull cables 22r and 22l each having one end connected to the corresponding rear slider 7, and defining a driven rack gear 21 formed by spirally winding a steel wire around a steel core wire and meshing with the drive gear 23. The electric motor 24 includes a main body elongated in the direction of a rotor shaft thereof (not shown in the drawings) and at an angle with respect to the lateral direction of the vehicle body. The rear and inboard end of the main body of the electric motor 24 is provided with a gear reduction mechanism which transmits the rotation of the rotor shaft of the electric motor 24 to the output shaft that supports the drive gear 23 and extends vertically.

A map lamp unit 30 is attached to the front frame 12 via a bracket not shown in the drawing, and fitted into an opening 29b formed in the roof lining 29 at a laterally central part therefore (FIG. 7) so that the map lamp unit 30 is received in a space defined between the fixed roof panel 1 and roof lining 29 but is exposed to the passenger compartment. Therefore, the map lamp unit 30 is located centrally adjacent to the front edge of the roof opening 2a while the electric motor 24 is placed laterally offset from the map lamp unit 30 so as not to interfere with each other. In particular, the electric motor 24 does not substantially overlap with the map lamp unit 30 when viewed from the front but substantially overlaps with the map lamp unit 30 when viewed from the side. See FIGS. 7 and 8.

Each push-pull cable 22 includes a drive cable section 22a extending from the drive gear 23 to the corresponding rear slider 7 to transmit the drive force of the electric motor 24 to the rear slider 7, and an idle cable section 22b extending from the drive gear 23 in the opposite direction from the drive cable section 22a without being subjected to any loading. The drive cable section 22a is linearly guided by the cable guide section 11c of the side frame 11, and guided by a drive pipe 25 secured to the front frame 12 between the drive gear 23 and the front end of the cable guide section 11c along a curved path. The drive pipe 25 may be conveniently made of plastic material that allows the drive pipe 25 to be curved as desired without any difficulty. The idle cable section 22b is likewise guided by an idle pipe 26 secured to the front frame 12 along a partly curved path (FIG. 5). As the electric motor 24 is offset in the rightward direction, a part of the idle pipe 261 (the part located to the right of the drive gear 23 in FIG. 1) for the left push-pull cable 22l extends rearward from the right end of the front frame 12, and the remaining part of the idle pipe 261 extends along the right side frame 11r (FIG. 2).

These guide pipes (drive pipes 25 and idle pipes 26) not only protect the push-pull cables 22 from moisture, dust and other foreign matters, but also control the deflection of the push-pull cable 22 as being pushed and pulled by the drive gear 23 so that the rear sliders 7 may be displaced in a prescribed relationship to the rotational angle of the drive gear 23. The two push-pull cables 22l and 22r oppose each other in a mutually parallel relationship (both extending in the lateral direction) at the drive gear 23, and are urged toward each other by spring members so that the rotational movement of the drive gear 23 may be transmitted to the rear sliders 7l and 7r in a properly synchronized relationship. In the illustrated embodiment, the push-pull cable 22 connected to the right lateral end of the sunroof panel 4 or the right rear slider 7r extends along the front side of the drive gear 23, and the push-pull cable 22 connected to the left lateral end of the sunroof panel 4 or the left rear slider 7l extends along the rear side of the drive gear 23.

The sunroof panel 4 defines an outer contour continuously and smoothly connected to the roof panel 2 in the fully closed position thereof. When the electric motor 24 further pulls the push-pull cables 22 via the drive gear 23 from the fully closed position of the sunroof panel 4, the rear end of the sunroof panel 4 is raised to place the sunroof panel 4 in a tilted up position by means of the cam mechanism incorporated in the rear sliders 7. When the push-pull cables 22 are pushed from this state, the sunroof panel 4 is tilted down, and returns to the fully closed position. When the push-pull cables 22 are pushed from the fully closed position, the rear sliders 7 are displaced rearward, and this causes the sunroof panel 4 to be lowered below the roof panel 2 and to be moved rearward at the same time. When the sunroof panel 4 is displaced to the rearmost position thereof, the opening 2a is fully opened. When the push-pull cables 22 are pulled from this state, the sunroof panel 4 eventually closes the roof opening 2a reversing the aforementioned process.

The structure of the vehicle roof around the front frame 12 is now described in the following with reference to FIGS. 4 to 8. FIG. 4 shows the part of the roof 1 surrounding the front frame 12 in plan view with the roof panel 2 and sunroof panel 4 indicated by imaginary lines. Referring to FIGS. 4 and 5, the front frame 12 includes front planar part 12a extending under and in parallel with the roof panel 2 (thereby slightly sloping downward toward the front). As shown in FIG. 4, the front planar part 12a includes two forwardly extending portions 42, 44 which are spaced apart from one another, and an open portion 46 disposed between the forwardly extending portions. The open portion 46 is recessed in a longitudinally rearward direction in relation to the forwardly extending portions 42, 44 on either side thereof, as shown, and provides an accommodation space to receive the map lamp unit 30 (on-board device) therein. The front frame 12 also includes a rear planar part 12b extending horizontally behind the front planar part 12a at a lower elevation, and a groove part 12c located between the front planar part 12a and rear planar part 12b and depressed more than these two parts. The groove part 12c includes a front wall 12d, a rear wall 12e and a bottom wall 12f, and the bottom wall 12f is lower than the front planar pat 12a or the rear planar part 12b.

The front planar part 12a is provided with a drive pipe retaining groove 16l (16r) for retaining the drive pipe 25 and an idle pipe retaining groove 17r (17l) for retaining the idle pipe 26, both opening out upward. A side wall of each pipe retaining groove 16 and 17 is provided with a plurality of clamps 18 including resilient tabs 18a resiliently clamping the drive and idle pipes 25 and 26 against the opposing side wall. The free end of each resilient tab 18a is formed with a barb that facilitates the insertion of the pipe 25, 26 into the groove 16, 17, but opposes the dislodging of the pipe from the groove. Thereby, the drive and idle pipes 25 and 26 can be easily installed and removed as required, and are additionally prevented from deflecting once installed even when the drive and idle pipes 25 and 26 are made of relatively flexible plastic material and the push-pull cables 22 received therein are subjected to tensile and compressive forces.

As shown in FIGS. 4 and 6, the front planar part 12a is formed with a through hole 15 at a part laterally offset to the right from the center for passing the drive gear 23 from below, and the two pipe retaining grooves extend along the front and rear sides of the through hole 15 both in the lateral direction (in a mutually parallel relationship). In particular, the drive pipe retaining groove 16l and the idle pipe retaining groove 17l for the left push-pull cable 22l extends along the rear side of the drive gear 23, and the drive pipe retaining groove 16r and the idle pipe retaining groove 17r for the right push-pull cable 22r extend along the front side of the drive gear 23.

The drive pipe retaining grooves 16l and 16r are provided at a substantially same elevation as the front planar part 12a over the entire lengths thereof (FIG. 5). On the other hand, the idle pipe retaining grooves 17l and 17r are at the substantial same elevation as the front planar part 12a only in the part adjacent to the through hole 15, and slope progressively downward toward the both lateral sides of the vehicle body so that the idle pipe retaining grooves 17l and 17r are enabled cross under the drive pipe retaining grooves 16*l* and 16*r* without interfering with them (FIG. 4).

The front part of the front frame 12 of the front planar part 12 is provided with a plurality (four, in the illustrated embodiment) of mounting bosses 14*a* to 14*d* projecting upward and arranged laterally at an approximately regular interval. Each mounting boss is formed with a through hole for receiving a fastener such as a screw or clip that secures the front frame 12 to the roof panel 2 (via a bracket not shown in the drawings). As the front frame 12 is attached to the roof panel 2 at the four locations, the stiffness of the front frame 12 is ensured, and is prevented from excessively deforming or breaking when subjected to the force transmitted from the push-pull cables 22 even though the front frame 12 is made of light-weight plastic material.

The groove part 12*c* of the front frame 12 is provided with a drain outlet 12*g* on each lateral end thereof for expelling the rainwater received in the groove part 12*c* to the drain system of the sunroof system 3 not shown in the drawings. The bottom wall of the drain outlet 12*g* is substantially at the same elevation as that of the groove part 12*c*, and the height of the side walls of each drain outlet 12*g* is determined so as not interfere with the idle pipe 26 extending above the drain outlet 12*g*.

As shown in FIGS. 4, 7 and 8, the map lamp unit 30 is provided centrally on the front edge of the roof opening 2*a*, and is received in the opening 29*b* formed in the roof lining 29 so as to face the interior of the passenger compartment 28. The map lamp unit 30 is fixedly secured to the roof panel 2 via a bracket not shown in the drawings. The map lamp unit 30 may include map lamps for illuminating localized parts of the front seats, a room lamp for illuminating the entire passenger compartment 28 and a switch panel for turning on and off these lamps and controlling the sunroof system 3, as a single assembly supported by a common frame. The main part of the map lamp unit 30 is received in the space between the roof lining 29 and roof panel 2, and the lower surface of the map lamp unit 30 is substantially flush with the surface of the remaining part of the roof lining 29.

The map lamp unit 30 is located between the front wall 12*d* of the front frame 12 and the rear wall of the front roof frame 9 without interfering with them. In particular, in side view, the map lamp unit 30 is located ahead of the front wall 12*d* of the front frame 12, and the rear end of the map lamp unit 30 may be located under the front planar part 12*a*. Because the electric motor 24 is located so as not to overlap with the map lamp unit 30 in front view, the map lamp unit 30 may overlap with the electric motor 24 in side view without interfering with each other. By positioning the map lamp unit 30 so as to be partly located under the front planar part 12*a* of the front frame 12 and overlap with the electric motor 24 in side view, the distance between the front frame 12 and front roof frame 9, in particular the distance between the front edge of the roof 1 to the front edge of the roof opening 2*a* of the roof panel 2 can be minimized so that the vehicle occupant's viewing angle of the front edge of the roof opening 2*a* can be minimized. The electric motor 24 is also located between the rear wall of the front roof frame 9 and the front wall 12*d* of the front frame 12, and about a rear half of the electric motor 24 is located under the front planar part 12*a* of the front frame 12. As the electric motor 24 and map lamp unit 30 do not overlap each other in plan view (FIG. 4), the thickness of the roof 1 or the distance between the lower surface of the roof lining 29 and upper surface of the roof panel 2 can be minimized.

Each sun visor 31 is located on the side (or the lower side) of the roof lining 29 facing the passenger compartment 28, and is pivotable around a pivot shaft 31X extending laterally between a stowed position closely overlying the lower surface of the roof lining 29 as indicated by the solid lines in FIG. 6, and a deployed position extending vertically downward from the pivot shaft 31X as indicated by the imaginary lines in FIG. 6 to shield the sunlight from the front from the view of the vehicle occupant.

In particular, because the electric motor 24 is placed in a laterally offset position, one of the sun visors 31 is located under the electric motor 24 in the stowed position thereof in an overlying relationship in plan view, the sun visor 31 can shield or muffle the acoustic noises generated from the electric motor 24. The roof lining 29 is formed with a pair of recesses 29*c* for at least partly receiving the corresponding sun visors 31 therein. The rear end of each recess 29*c* is located ahead of the front wall 12*d* of the groove part 12*c* of the front frame 12 so that the recesses 29*c* can be formed by making use of the space available above the upper surface of the corresponding parts of the roof lining 29, and the protrusion of the sun visors 31 from the lower surface of the roof lining 29 can be minimized.

Referring to FIG. 4, the leftmost mounting boss 14*a* is located between the drive pipe retaining groove 16*i* and idle pipe retaining groove 17*r* on the front planar part 12*a* of the front frame 12, and the second mounting boss 14*b* from the left is located adjacent to the left end of the map lamp unit 30. The third mounting boss 14*c* from the left is located adjacent to the right end of the map lamp unit 30 or between the map lamp unit 30 and electric motor 24, and the rightmost mounting boss 14*d* is located adjacent to the right end of the electric motor 24 and between the drive pipe retaining groove 16*r* and idle pipe retaining groove 17*l* on the front planar part 12*a* of the front frame 12. Therefore, two of the attaching points 14*a* and 14*d* are located between the two push-pull cables on either side of the middle crossing location. In the illustrated embodiment, the four mounting bosses 14*a* to 14*d* are arranged at an equal interval, but may also be located at irregular intervals.

As the third mounting boss 14*c* is located between the map lamp unit 30 and electric motor 24, the spacings between the adjacent mounting bosses 14*a* to 14*d* can be at least relatively uniform without causing any one of the spacings to be excessively great so that the front frame 12 is free from any low-stiffness region even though the front frame 12 is made of plastic material or other relatively flexible material. As the two of the mounting bosses 14*c* and 14*d* are provided on either side of the electric motor 24 in close proximity, the stiffness of the part of the front frame 12 adjacent to the electric motor 24 is particularly increased so that the front frame 12 is prevented from excessively deforming or breaking by the force transmitted from the electric motor 24 when actuating the push-pull cables 22 even though the front frame 12 is made of plastic material or other relatively flexible material.

Although the present invention has been described in terms of a preferred embodiment thereof, it is obvious to a person skilled in the art that various alterations and modifications are possible without departing from the scope of the present invention which is set forth in the appended claims. For instance, the present invention is equally applicable to a sunroof system which is capable of only the slide movement, and also to a sunshade system which opens and closes a moveable roof panel in the form of a sunshade configured to open and close an opening provided in the roof lining. For actuating the sunroof or sunshade panel, rack belts and other cables capable of transmitting the actuating force can also be used, instead of the push-pull cables of the illustrated embodiment, without departing from the spirit of the present invention.

The contents of the original Japanese patent application on which the Paris Convention priority claim is made for the present application as well as the contents of the prior art references mentioned in this application are incorporated in this application by reference.

The invention claimed is:

1. A vehicle roof system for closing and opening a roof opening formed in a fixed roof panel of a vehicle with a moveable roof panel, said vehicle roof system comprising:
 a front frame secured to a lower surface of the fixed roof panel and extending laterally along a front edge of the roof opening, the front frame including a laterally extending groove part including a front wall, a bottom wall and a rear wall, and a front planar part extending substantially horizontally forward from an upper end of the front wall at a higher elevation than the bottom wall, and the front frame being fixedly secured to the fixed roof panel at a plurality of mounting features provided on the front planar part;
 an electric motor attached to the front frame;
 a power transmitting system for transmitting an output of the electric motor to the moveable roof panel; and
 an onboard device operatively attached to the fixed roof panel of the vehicle adjacent to the front edge of the roof opening and located below the front planar part;
 wherein the onboard device is located in a laterally central part of the fixed roof panel, and the electric motor is laterally offset from but longitudinally overlapping with the onboard device.

2. The vehicle roof system according to claim 1, wherein at least one of the mounting features is located between the onboard device and electric motor.

3. The vehicle roof system according to claim 1, wherein two of the mounting features are provided adjacent to either lateral side of the electric motor.

4. The vehicle roof system according to claim 1, wherein the electric motor is attached to the lower surface of the front planar part, and has an output shaft passed through an opening formed in the front planar part, and the power transmitting system includes a pair of push-pull cables guided along an upper surface of the front planar part to transmit an output power of the electric motor to the moveable roof panel, wherein at least part of the electric motor is situated forward of the push-pull cables.

5. The vehicle roof system according to claim 4, further comprising a roof lining secured to a lower surface of the fixed roof panel and at least partly defining a space therebetween, the onboard device being exposed to a passenger compartment through an opening formed in the roof lining, wherein the onboard device has a lower surface which is substantially flush with a lower surface of the roof lining.

6. The vehicle roof system according to claim 5, wherein at least a rear end of the onboard device is located under the front planar part.

7. The vehicle roof system of claim 1, wherein the front planar part of the front frame has an open portion formed substantially centrally therein which is recessed in a longitudinally rearward direction and configured to accommodate an onboard device.

8. A vehicle roof system for closing and opening a roof opening formed in a fixed roof panel of a vehicle with a moveable roof panel, said vehicle roof system comprising:
 a front frame secured to a lower surface of the fixed roof panel and extending laterally along a front edge of the roof opening, wherein a laterally central portion of the front frame includes a front planar part extending substantially horizontally forward and having an open portion formed substantially centrally therein which is recessed in a longitudinally rearward direction and configured to accommodate an onboard device;
 an electric motor attached to the front frame;
 a power transmitting system for transmitting an output of the electric motor to the moveable roof panel;
 an onboard device comprising at least one lamp for selectively illuminating an interior portion of the vehicle, and at least one switch for controlling operation of the moveable roof panel, said onboard device operatively attached to the fixed roof panel of the vehicle adjacent to the front edge of the roof opening; and
 a roof lining secured to a lower surface of the fixed roof panel and at least partly defining a space therebetween, the onboard device being exposed to a passenger compartment through an opening formed in the roof lining,
 wherein the onboard device is located in a laterally central part of the fixed roof panel proximate the open portion of the front frame, and the electric motor is laterally offset from, and longitudinally overlapping with the onboard device.

9. The vehicle roof system according to claim 8, wherein the front frame includes a front planar part extending substantially horizontally and a groove part formed along a rear edge of the front planar part, the groove part including a bottom wall located at a lower elevation than the front planar part, and wherein the front frame is fixedly secured to the fixed roof panel at a plurality of mounting features provided on the front planar part.

10. The vehicle roof system according to claim 8, wherein the electric motor is attached to the lower surface of the front planar part, and has an output shaft passed through an opening formed in the front planar part, and the power transmitting system includes a pair of push-pull cables guided along an upper surface of the front planar part to transmit an output power of the electric motor to the moveable roof panel, wherein at least part of the electric motor is situated forward of the push-pull cables.

11. The vehicle roof system according to claim 8, wherein the onboard device has a lower surface which is substantially flush with a lower surface of the roof lining.

12. The vehicle roof system according to claim 8, wherein the front frame is fixedly secured to the fixed roof panel at a plurality of mounting features provided thereon.

* * * * *